US008846830B2

(12) United States Patent
Chamayou et al.

(10) Patent No.: US 8,846,830 B2
(45) Date of Patent: *Sep. 30, 2014

(54) INTERLOCK AND PROCESS

(75) Inventors: Jean-Louis Chamayou, Carry le Rouet (FR); Stephen Kevin Lee, Merton Park (GB)

(73) Assignee: Ineos Sales (UK) Limited, Hampshire (GB)

( * ) Notice: Subject to any disclaimer, the term of this patent is extended or adjusted under 35 U.S.C. 154(b) by 202 days.

This patent is subject to a terminal disclaimer.

(21) Appl. No.: 13/700,597

(22) PCT Filed: Jun. 28, 2011

(86) PCT No.: PCT/EP2011/060791
§ 371 (c)(1),
(2), (4) Date: Nov. 28, 2012

(87) PCT Pub. No.: WO2012/004154
PCT Pub. Date: Jan. 12, 2012

(65) Prior Publication Data
US 2013/0072644 A1    Mar. 21, 2013

(30) Foreign Application Priority Data
Jul. 8, 2010  (EP) .................................... 10168853

(51) Int. Cl.
| | |
|---|---|
| *F16B 39/28* | (2006.01) |
| *C08F 2/00* | (2006.01) |
| *C08F 110/02* | (2006.01) |
| *C08F 110/06* | (2006.01) |
| *C08F 2/06* | (2006.01) |
| *B01J 19/00* | (2006.01) |
| *C08F 2/34* | (2006.01) |
| *C08F 2/01* | (2006.01) |
| *F26B 25/00* | (2006.01) |
| *B01J 8/00* | (2006.01) |
| *C08F 10/06* | (2006.01) |
| *C08F 10/00* | (2006.01) |

(52) U.S. Cl.
CPC ... *C08F 2/01* (2013.01); *C08F 2/06* (2013.01); *B01J 19/00* (2013.01); *C08F 2/34* (2013.01); *F26B 25/00* (2013.01); *B01J 8/0035* (2013.01); *B01J 8/0015* (2013.01); *B01J 2208/00061* (2013.01); *C08F 10/06* (2013.01); *C08F 2400/02* (2013.01); *C08F 10/00* (2013.01); *B01J 2219/00268* (2013.01); *B01J 19/002* (2013.01); *C08F 110/02* (2013.01); *C08F 110/06* (2013.01); *B01J 2208/00761* (2013.01)
USPC .............. 526/61; 526/351; 526/352; 411/110

(58) Field of Classification Search
USPC .............................. 526/61, 351, 352; 422/110
See application file for complete search history.

(56) References Cited

U.S. PATENT DOCUMENTS

| | | | |
|---|---|---|---|
| 3,257,375 A | 6/1966 | Norwood | |
| 6,255,411 B1 | 7/2001 | Hartley et al. | |
| 2009/0124779 A1* | 5/2009 | Cousin et al. | 526/348 |

FOREIGN PATENT DOCUMENTS

| | | |
|---|---|---|
| EP | 1 914 246 A1 | 4/2008 |
| EP | 1 914 248 A1 | 4/2008 |
| EP | 1 914 249 A1 | 4/2008 |
| EP | 1 914 250 A1 | 4/2008 |
| EP | 2 030 757 A1 | 3/2009 |
| EP | 2 172 494 A1 | 4/2010 |
| WO | WO 93/13843 A1 | 7/1993 |
| WO | WO 02/12353 A1 | 2/2002 |
| WO | WO 2004/039848 A1 | 5/2004 |
| WO | WO 2008/024517 A2 | 2/2008 |
| WO | WO 2008/024517 A3 | 2/2008 |

OTHER PUBLICATIONS

Specification of Co-pending U.S. Appl. No. 13/700,540, filed Nov. 28, 2012, 16 pgs.
PCT International Search Report; International Application No. PCT/EP2011/060787, mailed Sep. 13, 2011 (2 pgs.).
Specification of Co-pending U.S. Appl. No. 13/700,855, filed Nov. 29, 2012, 17 pgs.
PCT International Search Report; International Application No. PCT/EP2011/060793, mailed May 10, 2011 (2 pgs).
Choi, K.Y., et al; "The Dynamic Behavior of Continuous Stirred-Bed Reactors for the Solid Catalyzed Gas Phase Polymerization of Propylene"; *Chemical Engineering Science*, vol. 43, No. 10; pp. 2587-2604 (1988) XP-002610731.

* cited by examiner

*Primary Examiner* — William Cheung
(74) *Attorney, Agent, or Firm* — Nixon & Vanderhye P.C.

(57) ABSTRACT

The present invention relates to production of polymer, and in particular provides an interlock for use in a process for production of a polymer in a reactor, which process comprises: a. polymerising a monomer and optionally a comonomer in the reactor to produce polymer, optionally in the presence of an inert hydrocarbon, and b. withdrawing produced polymer from the reactor, said interlock being based on the temperature in the reactor, and comprising: 1. measuring the temperature in the reactor or a temperature representative of the temperature in the reactor, and 2. comparing said measured temperature to a threshold temperature, said interlock being characterized in that withdrawal is allowed if the measured temperature is greater than the threshold temperature but is prevented if the measured temperature is lower than the threshold temperature.

25 Claims, No Drawings

INTERLOCK AND PROCESS

This application is the U.S. national phase of International Application No. PCT/EP2011/060791 filed 28 Jun. 2011 which designated the U.S. and claims priority to European Patent Application No. 10168853.9 filed 8 Jul. 2010, the entire contents of each of which are hereby incorporated by reference.

The present invention relates to production of polymer.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

In a slurry polymerisation process the polymerisation is conducted in a stirred tank or, preferably, a continuous loop reactor comprising mainly polyolefin, inert solvent (diluent) and a catalyst for the polymerisation. Polymer product is removed from the reactor in the form of a slurry in the reaction diluent.

The polymer product removed from the reactor in such polymerisation processes may contain unreacted monomers and other hydrocarbon species (for example, hydrogen, ethane, methane, propane, pentane, hexane, butane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

The removal of monomer and other residual hydrocarbons, which may be in gaseous or liquid form, is generally referred to as "degassing". One method that may be used is to contact the produced polymer with a gas in a purge vessel, usually a counter-currently flowing inert gas, such as nitrogen. This is generally referred to as "purging". Another method which can be used is to subject the polymer to a pressure reduction, usually in entry to a suitable vessel, with the result that at least a portion of any hydrocarbons in liquid form vaporise. This step may be referred to as "flashing". Such methods may also be combined e.g. a pressure reduction and a purge gas may be applied in the same degassing vessel.

There are a number of prior art patents which describe methods for the removal of such hydrocarbons from the products of gas phase and slurry processes including one or more of such steps, such as U.S. Pat. No. 4,372,758, EP 127253, U.S. Pat. No. 5,376,742 and WO 02/88194.

U.S. Pat. No. 4,372,758, for example, describes a process which uses an inert gas such as nitrogen for the removal of unreacted gaseous monomer from the polymer product. Solid polymer is conveyed to the top of a purge vessel by means of an inert gas system, an inert gas stream is introduced into the bottom of the purge vessel and the solid polymer is counter currently contacted with the inert gas stream to remove the unreacted gaseous monomers from the solid polymer product. The unreacted monomers may then be mixed with an inert gas stream which is often passed to a flare for disposal or vented to the atmosphere.

EP 127253 describes a process for the removal of residual monomers from ethylene copolymers by subjecting the copolymer to a reduced pressure zone sufficient to desorb the monomer, sweeping the copolymer with reactor gas which is free of inert gases and recycling the resultant gas containing the desorbed monomer to the polymerisation zone.

A number of factors affect the rate at which the residual monomers and other components that might be present are removed. U.S. Pat. No. 4,372,758 describes a number of these, including temperature and pressure in the purge vessel, resin particle size and morphology, monomer concentration in the resin, purge gas composition (monomer content) and purge gas flow rate, but there are also others.

More recently, WO 2008/024517 has described a method and apparatus for managing volatile organic content of polyolefins. In this disclosure a purge column model is described which is based on mass transfer theory, and which is used to control the degassing process such that the purge rates may be varied dependent on the polymer to be degassed.

The general teaching of the above is that increased removal of residual monomers can be achieved by increasing the temperature of the polymer powder (fluff) entering a purge vessel and/or the temperature of the purge gas, increasing the polymer residence time and/or increasing the stripping gas flow rate.

The degassing vessels are generally operated in order for the residual monomer level in the polymer to be reduced to desired levels prior to downstream treatment/processing. In particular, it is necessary to ensure that at the end of any degassing steps the residual hydrocarbon content is below any unsafe or environmentally unacceptable levels downstream. Although the degassing requirements can be determined experimentally or by past process experience for any particular polymer, the relationships are generally complex, and hence some form of measurement is required to ensure the required degassing.

In general, the degassing process will have interlocks which cause the degassing process to be stopped if a "major" disruption occurs, for example, a loss of purge gas flow.

It has now been found that an interlock based on a low temperature on the reactor is useful to maintain safe degassing. In particular, if the reactor temperature is lower than desirable or intended in the reaction vessel this will lead to greater levels of absorbed hydrocarbon on the polymer particles being withdrawn, and hence on the polymer entering the subsequent degassing vessel. This can "overload" the degassing vessel and result in higher levels of hydrocarbons not being removed in the degassing process.

Thus, in a first aspect, the present invention provides an interlock for use in a process for production of a polymer in a reactor, which process comprises:

a. polymerising a monomer and optionally a comonomer in the reactor to produce polymer, optionally in the presence of an inert hydrocarbon, and b. withdrawing produced polymer from the reactor, said interlock being based on the temperature in the reactor, and comprising:

1. measuring the temperature in the reactor or a temperature representative of the temperature in the reactor, and 2. comparing said measured temperature to a threshold temperature, said interlock being characterised in that withdrawal is allowed if the measured temperature is greater than the threshold temperature but is prevented if the measured temperature is lower than the threshold temperature.

As noted above, the concept of interlocks is known. In general terms interlocks may be provided for either safety or other operational reasons in a process. The present invention, however, relates to an "interlock" which relates to safety and as such the term "interlock" as used herein means an instrumented system which is designed to act in response to a condition within a process which indicates a potentially dangerous situation or consequence, and to thereby prevent or mitigate said situation or consequence.

The interlock monitors the process over time to check whether or not the condition does or does not indicate a potentially dangerous situation or consequence, and if the condition does indicate such a situation or consequence the interlock will act to prevent or mitigate said situation or consequence.

It should also be noted that an interlock tends to only act on the basis of whether a defined condition is or is not met i.e. the monitored condition either does indicate a potentially dangerous situation or consequence, in which case the interlock will act, or it does not, in which case the interlock will not act (or will stop acting if it previously was). Thus, whilst, in general, interlocks can act on a process condition, such as temperature or pressure, this is in addition to, and usually will override as necessary, more general "steady state" process control based on such parameters. Further, the defined condition will usually be a condition outside normal operating ranges. For example, in the present invention the threshold temperature will be outside of (below) the normal range of temperature in the reactor expected for the production of the relevant polymer.

Another feature of "interlocks" is that they generally require a "reset", usually a manual reset, once they have been triggered. Thus, once triggered, even if the condition which caused the interlock to be triggered no longer exists, the interlock needs to be reset before the interlock response can be turned off. As an example, in the present invention, if withdrawal of polymer has been prevented it does not automatically restart even if measured temperature increases above the threshold value.

In the present invention there is measured the temperature in the reactor or a temperature representative of the temperature in the reactor. Preferably, the temperature in the reactor is measured since reactor temperature measurement is routine and provides a direct measurement. Nevertheless, the present invention can equally be operated using a temperature representative of the reactor temperature. An example of such a measurement is the temperature of the fluidising gas exiting a fluidised bed polymerisation reactor.

In some embodiments of the present invention the threshold temperature may be "fixed", by which is meant the threshold temperature may be independent of the polymer being produced. The threshold temperature is then usually determined based on (and to be lower than, for example 10° C. lower than) the lowest reactor temperature of all polymers to be produced. However, although it is possible to have a fixed temperature threshold, it has been found for some processes, especially gas phase processes in which a wide range of polymer grades are produced, that it is difficult to define a single fixed value which provides safe operation for all grades. Thus, a variable interlock is generally preferred in such processes.

In such an embodiment, the threshold temperature may vary with the grade of polymer being produced. In this embodiment the threshold temperature could, in theory, be selected and be different for each grade. In general, efficient and safe process operation can be achieved by grouping different grades into groups which can have the same threshold temperature.

Numerous means can be used to determine the threshold temperature and how it may vary, and thus a suitable threshold temperature can be readily determined by the person skilled in the art. This could be, for example, based on previous operating experience on the typical temperature variations around the desired temperature for production of particular polymers and/or margins based on hydrocarbon residuals the operator is prepared to accept in subsequent degassing.

The variations acceptable by a particular operator when setting a threshold temperature may also depend on the relative efficiency and capacity of the subsequent degassing for increases in different components as temperature changes in the reactor.

In one embodiment, the threshold temperature for a particular grade of polymer may be determined based on the total partial pressure in the reactor of "heavy hydrocarbons" for that grade, "heavy hydrocarbons" as used herein referring to those having 5 or more carbon atoms. In a particular example, which is discussed further below, the threshold temperature for a particular grade of polymer may be determined based on the total partial pressure in the reactor of inert hydrocarbons having 5 or more carbon atoms for that grade.

The threshold temperature may also depend on the catalyst-type and/or the comonomer being used.

In yet another example, the threshold value may be defined based on a minimum difference from the normal reaction temperature, for example 10° C. lower.

Combinations of the above and/or different parameters which may influence the temperature threshold may be used.

With respect to the example where the threshold temperature depends on the total partial pressure in the reactor of "heavy hydrocarbons", one embodiment of the first aspect of the present invention provides an interlock for use in a process for production of a polymer in a reactor, which process comprises:

a. polymerising a monomer and optionally a comonomer in the reactor in the gas phase to produce polymer, optionally in the presence of one or more inert hydrocarbons having 5 or more carbon atoms, and b. withdrawing produced polymer from the reactor,
said interlock being based on the temperature in the reactor, and comprising:

1. measuring the temperature in the reactor or a temperature representative of the temperature in the reactor, and
2. comparing said measured temperature to a threshold temperature, said interlock being characterised in that withdrawal is allowed if the measured temperature is greater than the threshold temperature but is prevented if the measured temperature is lower than the threshold temperature, wherein the threshold temperature is dependent on the partial pressure in the reactor of hydrocarbons having 5 or more carbon atoms, preferably based on the partial pressure in the reactor of inert hydrocarbons having 5 or more carbon atoms.

This relationship is based on the fact that it has been found that it is changes in the absorbed amounts on the polymer of hydrocarbons having 5 or more carbon atoms which generally cause the biggest extra load on the degassing process downstream.

In many operations these heavy hydrocarbons, although they can include comonomers having for 5 or more carbon atoms, are dominated by inert hydrocarbons having 5 or more carbon atoms which are present, and the threshold temperature can be dependent on the partial pressure in the reactor of hydrocarbons having 5 or more carbon atoms.

The threshold temperature may, for example, be determined based on partial pressure in the reactor of inert hydrocarbons having 5 or more carbon atoms according to a formula of the form:

$$T_t = T_f + \Sigma^i A_i \cdot PP_i \quad (1)$$

wherein:

$T_t$ is the threshold temperature, $T_f$ is a temperature constant, i is at least 5 and is the number of carbon atoms in an inert hydrocarbon, $A_i$ is a positive constant (for inert hydrocarbons with i carbon atoms), and $PP_i$ is the partial pressure in the reactor of inert hydrocarbons having i carbon atoms.

i is an integer and is at least 5. Usually "i" is in the range of 5 to 10 inclusive i.e. the inert hydrocarbons are pentanes, hexanes, heptanes, octanes, nonanes and decanes. Thus, for processes having no inert hydrocarbon, the threshold temperature is constant (equal to $T_f$ in equation 1 above).

In contrast, for processes which utilise inert hydrocarbons such as pentane and hexane, the threshold temperature is increased. In particular, for a process using pentane as an inert hydrocarbon, $T_t = T_f + A_5 \cdot PP_5$, where $A_5$ is a positive constant (the "5" indicating that this is the constant relevant to inert hydrocarbons having 5 carbon atoms) and $PP_5$ is the partial pressure of pentane. In contrast, for a process using both pentane and hexane as inert hydrocarbons, $T_t = T_f + A_5 \cdot PP_5 + A_6 \cdot PP_6$ where $A_5$ and $A_6$ are positive constants and $PP_5$ and $PP_6$ are the respective partial pressures of pentane and hexane.

For avoidance of doubt, where different hydrocarbon isomers having the same number of carbon atoms are present, such as n-hexane and i-hexane, $PP_i$ represents the total partial pressure of such hydrocarbons having i carbon atoms.

The exact values for $T_f$ and for each $A_i$ can generally be determined by the person skilled in the art for a particular process as noted previously, but in this case also based on a determination of the absorption of each inert hydrocarbon for a particular temperature and partial pressure in the process, and the safety margins the operator is prepared to accept. The determination of the absorption of inert hydrocarbon for a particular temperature and partial pressures can be a calculation or model, for example on equilibrium constants, or can be derived from experimental observations. The values of $T_f$ and each $A_i$ utilised by a particular operator may also depend on the relative efficiency and capacity of the subsequent degassing for increases in different components. For example, it may be that a relatively high value of $T_f$ is used if the operator wishes to maintain higher safety margins, whilst relatively small values of $A_i$ may be used if the subsequent degassing deals well with increases in inert hydrocarbons.

Preferably, and in particular for a gas phase fluidised bed process, $T_f$ is in the range 70 to 80° C., and $A_i$'s in the range 0.5 to 2.5° C. per 10 kPa (5 to 25°/bar), preferably in the range 0.5 to 2.0° C. per 10 kPa (5 to 20°/bar). Higher values of $A_i$ within this range are generally used for "heavier" hydrocarbons. In particular, $A_5$ is preferably in the range 0.5 to 1.0° C. per 10 kPa (5 to 10°/bar), $A_6$ is preferably in the range 1.0 to 1.5° C. per 10 kPa (10 to 15°/bar) and $A_g$ is preferably in the range 1.5 to 2.0° C. per 10 kPa (15 to 20°/bar). Thus, a 200 kPa partial pressure of hexane would increase $T_t$ by 20 to 30° C. relative to $T_f$.

The interlock of the present invention may respond to temperature variations in the reactor due to a number of possible causes. One example would be an excessive cooling of the reactor, for example due to a faulty flow valve on a coolant system. Another example would be an operator error where the operator tries to operate a reaction at a lower temperature than would normally be used for a particular grade of polymer. For example, for production of HDPE grades of polyethylene using ethylene as monomer it is common to use 2 or more bar (200 or more kPa) in a gas phase reactor of inert hydrocarbon, such as hexane, but to operate the reactor at in excess of 100° C., so despite the relatively large quantity of hexane absorption is acceptable. However, if the temperature was in fact 85° C. the absorption of hexane on the withdrawn polymer would be significantly increased, and may not be acceptable for downstream processing. In the present invention the interlock would prevent withdrawal of the polymer.

Where the interlock is activated one or more actions can be taken to correct the situation. The obvious one is to increase the reaction temperature until it exceeds the threshold value and the interlock allows withdrawal again. If this cannot be done however, for example if the temperature change is due to a problem that it going to take a significant time to correct, then the reactor may need to be shut-down.

The interlock according to the present invention can also be provided with a temporary override that will allow actions to be taken even when the triggering condition might otherwise be met. For example, in the present invention the interlock may be overridden so that withdrawal may be allowed in order to empty the reactor.

In a second aspect of the present invention, an interlock is used based on both pressure and temperature in the reactor, and comprises:

1. measuring the pressure in the reactor or a pressure representative of the pressure in the reactor
2. measuring the temperature in the reactor or a temperature representative of the temperature in the reactor,
3. comparing said measured pressure to a threshold pressure,
4. comparing said measured temperature to a threshold temperature, said interlock being characterised in that withdrawal is allowed if either:
   1. the measured pressure in the reactor is less than the threshold pressure, or
   2. the measured pressure in the reactor is greater than the threshold pressure and the measured temperature is greater than the threshold temperature, but is prevented if the measured pressure in the reactor is greater than the threshold pressure but the measured temperature is lower than the threshold temperature.

Put another way, in this aspect of the invention withdrawal is allowed even if the temperature in the reactor is below the threshold temperature, as long as the pressure is less than a threshold pressure.

In this aspect of the invention, a pressure threshold is selected to allow withdrawal during start-up or shut-down of the polymerisation process, and which acts to over-ride the temperature threshold which is used at higher pressure.

The temperature threshold in this aspect is preferably as for the first aspect of the invention.

Preferably, the pressure in the reactor is measured since reactor pressure measurement is routine and provides a direct measurement. Nevertheless, as with the temperature measurement, the present invention can equally be operated using a pressure representative of the reactor pressure.

As with the temperature threshold, the exact pressure threshold can be selected by the person skilled in the art, and could in theory be any pressure below the typical operating pressure of the process, the key requirement being that is distinguishes "normal" operation from start-up or shut-down processes. In general, a threshold pressure between ¼ and ¾ of the normal operating pressure is suitable for the pressure threshold. In absolute terms the threshold pressure is usually between 500 and 1500 kPa (5 to 15 bar).

In general terms, the interlocks of the present invention are applicable to any process which produces polymer and absorbed hydrocarbon. The invention is particularly applicable to processes for polymerisation of ethylene or propylene as monomer. Where these are polymerised with an olefin comonomer, the "monomer" is the olefin present in the larger amount (by weight of the reaction mixture) and the comonomer the olefin present in the smaller amount. The comonomer may be any olefin other than the monomer. For example, ethylene can be a comonomer in the polymerisation of propylene. Preferably the comonomer has 4 to 12 carbon atoms, for example 1-butene, 1-hexene or 1-octene, and most preferably comonomers having 6 or more carbon atoms.

In all aspects and embodiments, the polymerisation reaction of step (a) is preferably a gas phase process, for example a fluidised bed or stirred bed gas phase polymerisation process. An example of a stirred bed gas phase polymerisation process in a horizontally disposed reactor vessel can be found in U.S. Pat. No. 4,921,919. Preferred gas phase processes are fluidised bed gas phase processes in vertically orientated reactors, such as described in U.S. Pat. No. 5,376,742.

Nevertheless, in some embodiments the interlock may also be applied to a slurry process.

Thus, the interlock may be applied to a slurry process utilising isobutane as diluent. An example of a suitable slurry process is that found in WO 2008/024517.

In slurry processes, the threshold temperature is preferably fixed. In particular, such process generally operate with a significant amount of inert hydrocarbon as diluent, such as iso-butane or n-pentane, and small variations in such components or in other inert hydrocarbons make little relative difference on the requirements for diluent separation of downstream processes.

In particular, the present invention provides an interlock for use in a process for production of a polymer in a reactor, which process comprises:
a. polymerising a monomer and optionally a comonomer in the presence of a diluent in a reactor to produce a polymer slurry, and
b. withdrawing produced polymer slurry from the reactor, said interlock being based on the temperature in the reactor, and comprising:
  1. measuring the temperature in the reactor or a temperature representative of the temperature in the reactor, and
  2. comparing said measured temperature to a threshold temperature, said interlock being characterised in that withdrawal is allowed if the measured temperature is greater than the threshold temperature but is prevented if the measured temperature is lower than the threshold temperature.

The present invention also provides a process for a process for production of a polymer in a reactor, which process comprises:
a. polymerising a monomer and optionally a comonomer in the reactor to produce polymer, optionally in the presence of an inert hydrocarbon, and
b. withdrawing produced polymer from the reactor, said process using an interlock as described herein (in either the first or second aspect of the invention).

The process is preferably a process for polymerisation of ethylene or propylene as monomer as described already, and in particular most preferably is a gas phase process, for example a fluidised bed or stirred bed gas phase polymerisation process.

The invention will now be illustrated by way of the following examples:

EXAMPLE

Example 1

A fluidised bed polymerisation reactor has a diameter of 5 m, and is designed for operation with a fluidised bed having a height of 20 m. The reactor is designed and operated solely to produce LLDPE products (having a density range of approximately 915 to 940) and at production rates up to 40 to/hr.

The reactor temperature for all products is within the range 80 to 95° C. N-pentane is used as an inert hydrocarbon and at a partial pressure ranging from 0.5 to 4.0 bar (50 to 400 kPa) depending on the product.

Although a variable interlock could be used, with increased threshold temperature for higher pentane partial pressures, because of the relatively low temperature range of operation it is found that a fixed threshold temperature, having a value of 78° C. is suitable for all grades.

Example 2

In Example 2a fluidised bed polymerisation reactor of the same size as Example 1 is used, but the reactor is designed and operated to produce both LLDPE and HDPE products (having a total density range of approximately 915 to 960).

The reactor temperature range extends from 80 to 114° C. N-pentane can be used as inert hydrocarbon, in this case at a partial pressure ranging from 0 to 6 bar (0 to 600 kPa).

Higher partial pressures of n-pentane are generally used for the products formed at higher temperatures, with the partial pressure of 6 bar used for the product produced as 114° C. (Generally, the higher temperature used maintains manageable absorption of inert hydrocarbons on the withdrawn polymer since all things being equal absorption is less at higher temperatures). For such "high temperature" grades a fixed temperature interlock of 78° C., as used for Example 1, would not shut-off the withdrawal from the reactor sufficiently early in the event of a temperature reduction in the reactor. For example, it would be possible that a withdrawal would be "allowed" by the interlock at significantly lower reactor temperatures than would be considered desirable for the quantity of n-pentane present. This would result in a withdrawn polymer having much too high a level of absorbed hydrocarbons for the downstream degassing to deal with.

Thus, in this Example a variable threshold value is used, with $T_f$ of 78° C. and $A_5$ of 0.5° C. per 10 kPa (5° C./bar). Using these parameters, at a partial pressure of 6 bar n-pentane, the threshold value is increased to 108° C.

The invention claimed is:

1. An interlock for use in a process for production of a polymer in a reactor, which process comprises:
   a. polymerising a monomer and optionally a comonomer in the reactor to produce polymer, optionally in the presence of an inert hydrocarbon, and
   b. withdrawing produced polymer from the reactor, said interlock being based on the temperature in the reactor, and comprising the capabilities of:
      1. measuring the temperature in the reactor or a temperature representative of the temperature in the reactor, and 2. comparing said measured temperature to a threshold temperature, said interlock being characterised in that withdrawal is allowed if the measured temperature is greater than the threshold temperature but is prevented if the measured temperature is lower than the threshold temperature.

2. An interlock for use in a process for production of a polymer in a reactor, which process comprises:
   a. polymerising a monomer and optionally a comonomer in the reactor to produce polymer, optionally in the presence of an inert hydrocarbon, and
   b. withdrawing produced polymer from the reactor,
   said interlock being based on the pressure and the temperature in the reactor, and comprising the capabilities of:
   1. measuring the pressure in the reactor or a pressure representative of the pressure in the reactor,
   2. measuring the temperature in the reactor or a temperature representative of the temperature in the reactor,
   3. comparing said measured pressure to a threshold pressure,
   4. comparing said measured temperature to a threshold temperature, said interlock being characterised in that withdrawal is allowed if either:
      1. the measured pressure in the reactor is less than the threshold pressure, or
      2. the measured pressure in the reactor is greater than the threshold pressure and the measured temperature is greater than the threshold temperature,
   but is prevented if the measured pressure in the reactor is greater than the threshold pressure but the measured temperature is lower than the threshold temperature.

3. An interlock according to claim 2 wherein the threshold pressure is between 500 and 1500 kPa.

4. An interlock according to claim 1 wherein the threshold temperature is variable and is based on the total partial pressure in the reactor of hydrocarbons.

5. An interlock according to claim 2 wherein the threshold temperature is variable and is based on the total partial pressure in the reactor of hydrocarbons.

6. An interlock according to claim 1 wherein the polymerisation reaction of step (a) is a gas phase process, for example a fluidised bed or stirred bed gas phase polymerisation process.

7. An interlock according to claim 2 wherein the polymerisation reaction of step (a) is a gas phase process, for example a fluidised bed or stirred bed gas phase polymerisation process.

8. An interlock according to claim 6, wherein the process comprises:
   a. polymerising a monomer and optionally a comonomer in the reactor in the gas phase to produce polymer, in the presence of one or more inert hydrocarbons having 5 or more carbon atoms, and
   b. withdrawing produced polymer from the reactor, and characterised in that the threshold temperature is dependent on the partial pressure in the reactor of inert hydrocarbons having 5 or more carbon atoms.

9. An interlock according to claim 8 wherein the threshold temperature varies according to the formula:

$$T_t = T_f + \Sigma^i A_i \cdot PP_i \qquad (1)$$

wherein:
$T_t$ is the threshold temperature,
$T_f$ is a temperature constant,
i is at least 5 and is the number of carbon atoms in an inert hydrocarbon present in the reactor,
$A_i$, is a positive constant (for inert hydrocarbons with i carbon atoms), and
$PP_i$, is the partial pressure in the reactor of inert hydrocarbons having i carbon atoms.

10. An interlock according to claim 9 wherein $T_f$ is in the range 70 to 80° C., and $A_i$'s are in the range 0.5 to 2.5° C. per 10 kPa (5 to 25°/bar).

11. An interlock according to claim 10 wherein $A_5$ is in the range 0.5 to 1.0° C. per 10 kPa (5 to 10°/bar), $A_6$ is in the range 1.0 to 1.5° C. per 10 kPa (10 to 15°/bar) and A8 is in the range 1.5 to 2.0° C. per 10 kPa (15 to 20°/bar).

12. An interlock according to claim 7, wherein the process comprises:
   a. polymerising a monomer and optionally a comonomer in the reactor in the gas phase to produce polymer, in the presence of one or more inert hydrocarbons having 5 or more carbon atoms, and
   b. withdrawing produced polymer from the reactor, and characterised in that the threshold temperature is dependent on the partial pressure in the reactor of inert hydrocarbons having 5 or more carbon atoms.

13. An interlock according to claim 12 wherein the threshold temperature varies according to the formula:

$$T_t = T_f + \Sigma^i A_i \cdot PP_i \qquad (1)$$

wherein:
$T_t$ is the threshold temperature,
$T_f$ is a temperature constant,
i is at least 5 and is the number of carbon atoms in an inert hydrocarbon present in the reactor,
$A_i$, is a positive constant (for inert hydrocarbons with i carbon atoms), and
$PP_i$, is the partial pressure in the reactor of inert hydrocarbons having i carbon atoms.

14. An interlock according to claim 13 wherein $T_f$ is in the range 70 to 80° C., and $_i$'s are in the range 0.5 to 2.5° C. per 10 kPa (5 to 25°/bar).

15. An interlock according to claim 14 wherein $A_5$ is in the range 0.5 to 1.0° C. per 10 kPa (5 to 10°/bar), $A_6$ is in the range 1.0 to 1.5° C. per 10 kPa (10 to 15°/bar) and A8 is in the range 1.5 to 2.0° C. per 10 kPa (15 to 20°/bar).

16. An interlock according to claim 1 wherein the polymerisation reaction of step (a) is a process for polymerisation of ethylene or propylene as monomer.

17. An interlock according to claim 16 wherein there is used a comonomer having 4 to 12 carbon atoms, for example 1-butene, 1-hexene or 1-octene.

18. An interlock according to claim 2 wherein the polymerisation reaction of step (a) is a process for polymerisation of ethylene or propylene as monomer.

19. An interlock according to claim 18 wherein there is used a comonomer having 4 to 12 carbon atoms, for example 1-butene, 1-hexene or 1-octene.

20. A process for production of a polymer in a reactor, which process comprises:
   a. polymerising a monomer and optionally a comonomer in the reactor to produce polymer, optionally in the presence of an inert hydrocarbon, and
   b. withdrawing produced polymer from the reactor, said process using an interlock according to claim 1.

21. A process according to claim 20 wherein the process is a process for polymerisation of ethylene or propylene as monomer.

22. A process according to claim 21 wherein the process is a gas phase process, for example a fluidised bed or stirred bed gas phase polymerisation process.

23. A process for production of a polymer in a reactor, which process comprises:
   a. polymerising a monomer and optionally a comonomer in the reactor to produce polymer, optionally in the presence of an inert hydrocarbon, and
   b. withdrawing produced polymer from the reactor, said process using an interlock according to claim 2.

24. A process according to claim 23 wherein the process is a process for polymerisation of ethylene or propylene as monomer.

25. A process according to claim 24 wherein the process is a gas phase process, for example a fluidised bed or stirred bed gas phase polymerisation process.

* * * * *